United States Patent
Földes

(10) Patent No.: US 6,772,701 B2
(45) Date of Patent: Aug. 10, 2004

(54) ROTATIVE INCINERATOR

(76) Inventor: Gabor Földes, Bagoly u. 145, H-2030, Erd (HU)

( * ) Notice: Subject to any disclaimer, the term of this patent is extended or adjusted under 35 U.S.C. 154(b) by 0 days.

(21) Appl. No.: 10/363,927

(22) PCT Filed: Jul. 3, 2001

(86) PCT No.: PCT/HU01/00075

§ 371 (c)(1), (2), (4) Date: Mar. 7, 2003

(87) PCT Pub. No.: WO02/04865

PCT Pub. Date: Jan. 17, 2002

(65) Prior Publication Data

US 2004/0035338 A1 Feb. 26, 2004

(30) Foreign Application Priority Data

Jul. 13, 2000 (HU) .............................................. 0002612

(51) Int. Cl.⁷ ................................................ F23G 1/00
(52) U.S. Cl. ........................ 110/194; 110/275; 110/295
(58) Field of Search ................................. 110/194, 225, 110/226, 246, 275, 276, 295, 302, 346; 122/11, 12

(56) References Cited

U.S. PATENT DOCUMENTS

| | | | |
|---|---|---|---|
| 3,916,806 A | * 11/1975 | Giraud | ........................ 110/203 |
| 4,090,455 A | * 5/1978 | McCartney | .................. 110/232 |
| 4,257,335 A | 3/1981 | Albertsson | |
| 4,329,931 A | * 5/1982 | Burton | ........................ 110/346 |
| 4,781,174 A | * 11/1988 | Gardner | ...................... 126/681 |
| 5,657,705 A | * 8/1997 | Martin et al. | ................ 110/246 |
| 6,237,511 B1 | * 5/2001 | Honkasalo | ................... 110/342 |

FOREIGN PATENT DOCUMENTS

| | | | | |
|---|---|---|---|---|
| DE | 11175 | * 6/1900 | .................. 110/194 |
| DE | 627058 | * 2/1936 | .................. 110/194 |
| FR | 2626065 | * 1/1988 | ............. F23B/1/14 |
| GB | 2032596 | * 5/1980 | ............. H05B/6/80 |
| SU | 0640100 | * 12/1978 | ............. F27B/7/16 |

\* cited by examiner

Primary Examiner—Kenneth B. Rinehart
(74) Attorney, Agent, or Firm—Brooks Kushman P.C.

(57) ABSTRACT

An incinerator having incinerator chambers (3) of cylinder inner shape set at equal distance from rotary axle (t1) in an outer casing (1) provided with thermal insulation (2) rotated around (t1) are realized as incinerator units. The longitudinal axle of the incinerator chambers (3) is parallel with the rotary axle of the outer casing (1). Inside the incinerator chambers (3) incinerator carriages (21) are rolling on a roller path (30) for placing of the body to be incinerated. A door (18) ensuring placing of bodies is put on one of the front walls perpendicular to the rotary axle (t1) of the casing (1). On the opposite wall the incinerator is provided with a blast inlet (15) and a hot air feed pipe (9). One or more burners (13) are placed within the inside of the casing (1).

13 Claims, 11 Drawing Sheets

ROTATIVE INCINERATOR

Figure 1:
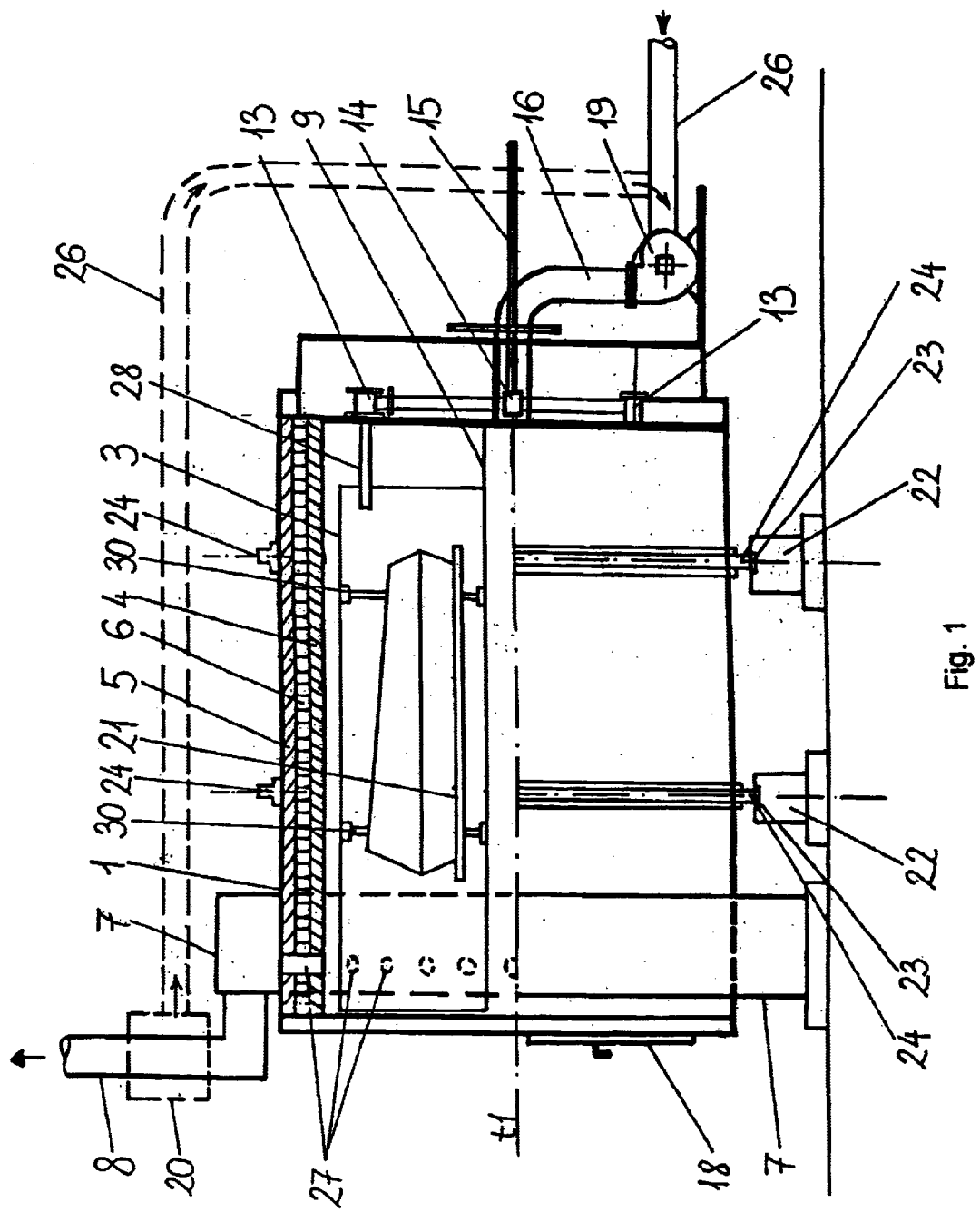

The invention relates to an incinerator of rotative system, which makes possible the continuous, economical and environment-friendly execution of incineration.

Incineration is getting more and more widespread as way of burial. Incineration has an old tradition in several cultures, e.g. in China and India in the Far East but the idea of incineration is also familiar for the European culture circle. During incineration the body of a deceased person is ordinarily incinerated in a furnace suitable for it or on a pile of logs, then the ashes are inurned or scattered about.

The incinerator applied during furnace incineration should comply with several practical duties towards the dead, a few of them will be mentioned as follows:

one body in one unit, handling and placing of bodies must be safe and respectful, ashes must not get mixed neither during incineration nor during removal, emission gases and by-products must not pollute the environment.

Incineration in itself is not an energy-consuming process, because most bodies consist of combustible materials, fats, carbohydrates, proteins, producing heat during combustion, but it is necessary to ensure and keep proper temperature during staring the incineration process and later maintaining it. Bodies consist of materials of lower combustibility and incombustible materials in smaller quantity, for example bones, their combustion will be ensured by heat produced during combustion of combustible materials.

According to the prior art patent application No. P 97 02010 published on 28.05.1999 makes known an incinerator suitable for incineration of dead human bodies according to prior art. The equipment comprises of an incineration area to be heated by hot gases and products of combustion and an area for smoke-gas flow. These areas are connected with each other by openings making possible access to the area for smoke-gas flow. All outer walls of the incinerator are placed in the area for smoke-gas flow and the equipment has a rigid mantle of cylinder shape enclosing the area for smoke-gas flow from outside. The rigid mantle of circle diameter, the area for smoke-gas flow and the incineration area is arranged concentric to a common central axle, the incineration area divided into one or more channel, perpendicular to the common central axle with constant cross-section is of fire-proof steel or ceramic walls and the equipment has at least one steel incineration tray replacing incineration coffin, which can be guided into the incineration area.

The disadvantage of the known solutions is, that they are not suitable to execute continuous process of incineration, because it is necessary to open the fire-box to remove the ashes after incineration of each body, to be able to place a new body. It is not possible to carry on incineration continuously, because during removal of the ashes and placing of the new body the inside of the incineration furnace cools down, therefore the new start of the incineration process is possible only with the re-heating of the incineration area, which requires additional heating material, takes certain time, which slows down execution of incinerations.

Working out the solution according to the invention our aim was to realise an incinerator of continuous operation, where the incineration equipment is suitable for incinerating several bodies at the same time, it has preferably one inlet, and in given case the equipment can be easily made mobile.

Working out the solution according to the invention we realised, that if we construct an incinerator equipment, where incinerator chambers are placed along a periphery of a rotatory casing in such a way, that placing of bodies into the incinerator chambers and in given case removal of the ashes can be executed through a door located at a certain point of the path of the rotating casing, then the set aim can be achieved. We further realized, that the set aim can be also achieved if the incinerator gondolas are suspended on a rotatable frame inside a closed casing standing on its own and the incinerator gondolas are rotated circularly together with the frame.

The object of the invention is an incinerator of rotative system consisting of several separated incinerator units heated with hot gases and/or hot air set in a common rigid outer casing built in such a way, that space between incinerator units serves holding and discharging of smoke-gas, which intermediate space has separate connection which each incinerator unit, further there is an incineration area in the incinerator unit serving direct or indirect placing of body to be incinerated. Said incinerator characterized by that, incinerator chambers of cylinder inner shape set preferably at equal distance from rotatory axle in an outer casing provided with thermal insulation rotated around an axle are realised as incinerator units, the longitudinal axle of the incinerator chambers is parallel with the rotatory axle of the outer casing, and inside the incinerator chambers on the inner surface of the incinerator chambers incinerator carriages are located, and said incinerator carriages are rolling preferably on a roller path provided on the inner surface of the incinerator chambers serving placing of the body to be incinerated. Further a door ensuring placing of bodies is put on one of the front walls perpendicular to the rotatory axle of the casing, on the opposite wall the equipment is provided preferably with a blast inlet and a hot air feed pipe, further one or more burner are placed within the inside of the casing.

The object of the invention is further an incinerator of rotative system set in a common rigid outer casing, heated with hot gases and/or hot air, consisting of several separated incinerator units, built in such a way, that space between incinerator units serves holding and discharging of smoke-gas, which intermediate space has separate connection which each incinerator unit, further there is an incineration area in the incinerator unit serving direct or indirect placing of body to be incinerated. Said incinerator characterized by that within the stationary outer casing provided with thermal insulation incineration gondolas are suspended on rotating frames in such a way, that the rotatory axle of the rotating frames is parallel with the rotatory axle of the outer casing, but said axle is vertically shifted by a distance upside. Further the equipment is provided with a door ensuring placing of bodies on one of the front walls perpendicular to the rotatory axle of the casing, on the opposite wall of the equipment preferably a blast inlet and a hot air feed pipe is provided, further one or more burner is placed within the inside of the casing.

In a preferred embodiment of one of the types of the incinerator according to the invention, there are minimum two, preferably three, or six, or twelve cylinder-shaped incinerator chambers at equal distance from the rotatory axle of the casing, said casing is preferably cylinder-shaped, and said incinerator chambers are preferably placed in equipartition along the periphery of the casing.

In another preferred embodiment of one of the types of the incinerator according to the invention, there is a fitting piece placed in the rotatory axle of the outer casing for blast inlet and gas-pipe, and there is a stationary smoke-holding chamber which completely encloses from outside the rotating outer casing and it joins a smoke-gas area situated in the inside of the outer casing to discharge smoke-gas through smoke outlets and the said smoke-holding chamber is channelled directly or indirectly to a chimney.

In another preferred embodiment of one of the types of the incinerator according to the invention, preferably there are outer rails on the outer casing to support and rotate the rotator of the equipment and said outer rails are supported from the outside by rollers and on the outer casing there is a cogged-curved path joining a cogwheel rotatory mechanism.

In another preferred embodiment of one of the types of the incinerator according to the invention, the rotatory axle of the casing of the equipment and the axles of the cylinder-shaped incinerator chambers located in the casing are horizontal or nearly horizontal and there are incinerator carriages in the incineration chambers, and said incinerator carriages are situated parallel with the rotatory axle of the casing.

In a further preferred embodiment of one of the types of the incinerator according to the invention, the rotatory axle of the casing of the equipment and the rotatory axle of the cylinder-shaped incineration chambers preferably angles $\alpha=5° \ldots 10°$ to horizontal surface, and there are incineration carriages situated horizontally or nearly horizontally in the incineration chambers and said incineration carriages angle $\alpha$ to the rotatory axle of the casing as well.

In a further preferred embodiment of one of the types of the incinerator according to the invention, the walls of the incinerator chambers are closed from the bottom and from the sides and said walls are situated longitudinally shifted to each other and in the walls of the incinerator chambers there are outlets for ashes to discharge automatically the ashes, and said outlets for ashes join grinding and holding units, and said grinding and holding units are placed outside the rotating casing below the equipment at a definite point of the turning of the casing.

In a further preferred embodiment of one of the types of the incinerator according to the invention, the walls of the incinerator chambers are perforated ensuring contact of the smoke-gas area inside the casing and the incinerator chambers.

In a preferred embodiment of another type of the incinerator according to the invention, suspensions of the incineration gondolas are located preferably at equal distance from the rotatory axle of the frame placed in equipartition along the periphery of said frame and the longitudinal axle of the incineration gondolas is parallel with the rotatory axle of the frame.

In another preferred embodiment of another type of the incinerator according to the invention, on the rotating frame there are preferably three, or four or six, or twelve incineration gondolas suspended.

In another preferred embodiment of another type of the incinerator according to the invention, the incineration gondolas are preferably of prismatic shape, they are closed from the bottom and from the sides, or their surface is partly or wholly provided with perforation.

Any preferred embodiment of the incinerator according to the invention can be executed either in a stabile, stationary finish, or a mobile one, which can be placed on a car or any other vehicle.

Solution according to the invention is set forth by the enclosed drawings:

FIG. 1. shows the equipment in a version with horizontal axle, a part of the equipment in lateral view and a part of the equipment in section can be seen.

Figure 2:
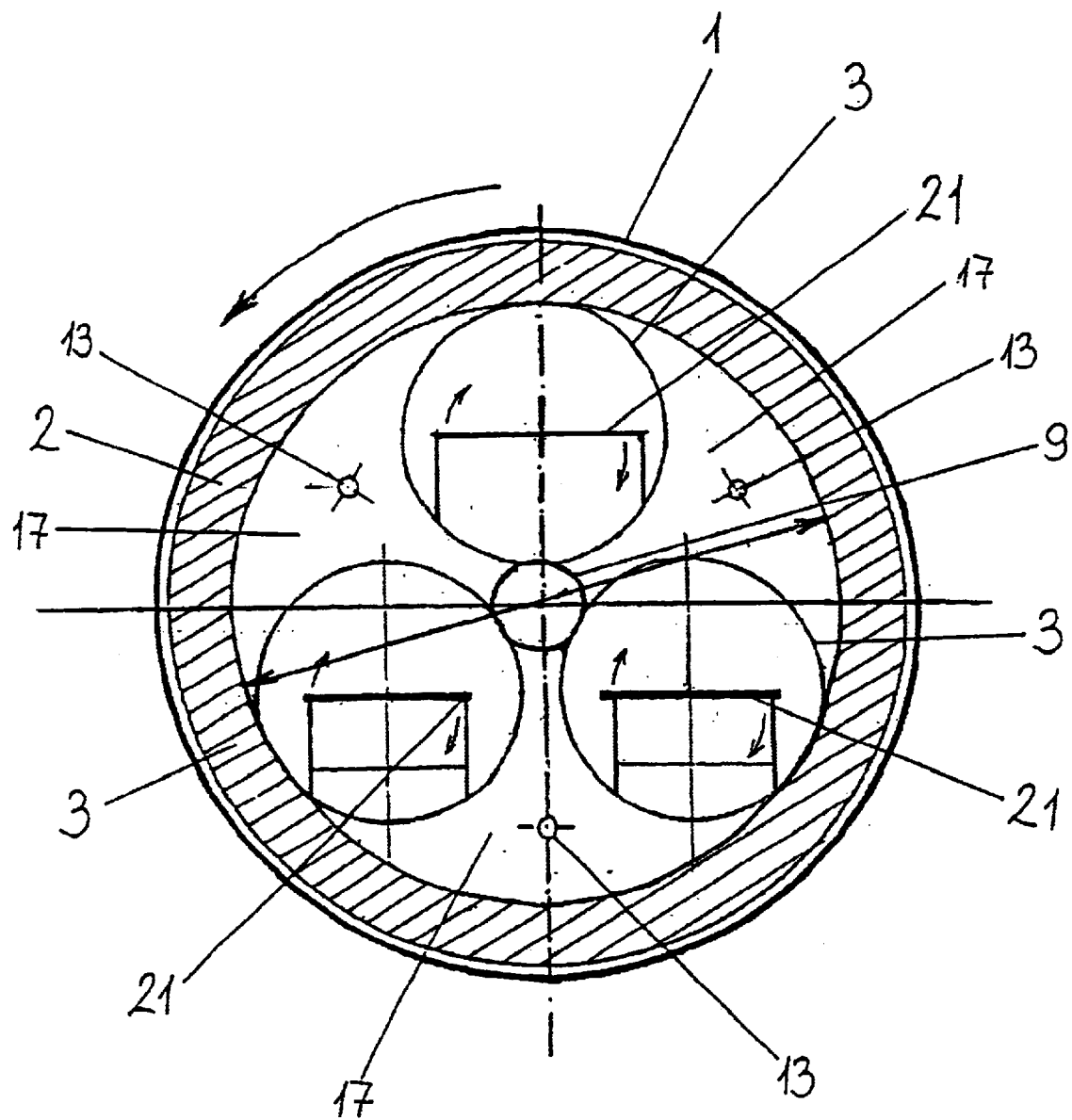

FIG. 2. shows the cross-section of the horizontal version of the equipment in case of three incineration chambers shown on FIG. 1.

Figure 3:
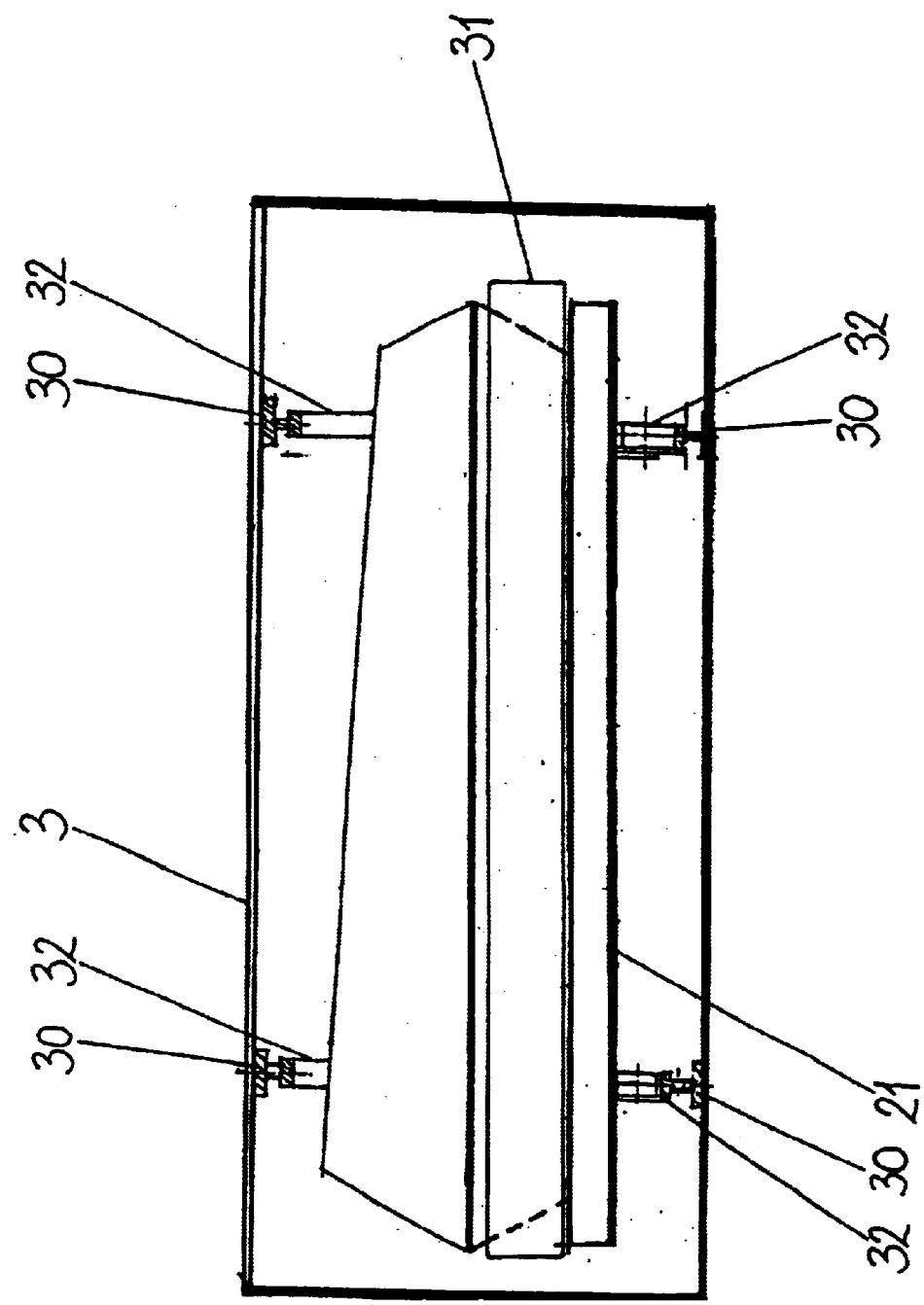

FIG. 3. shows the longitudinal section of the incineration chamber with horizontal axle with the placement of the incineration carriage.

Figure 4:
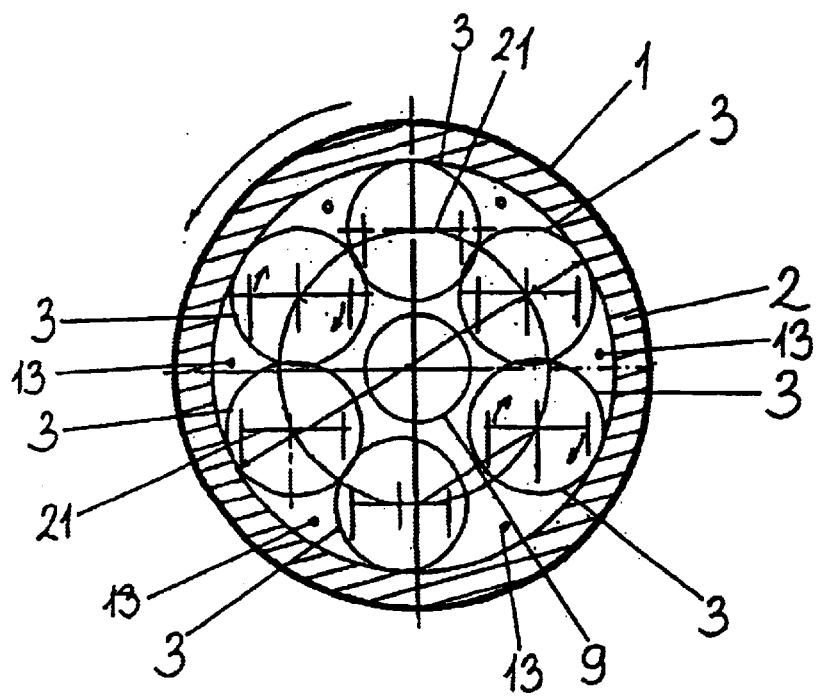

FIG. 4. shows the cross-section of the preferred embodiment of the equipment according to the invention, in case of six incineration chambers. (it refers to both the horizontal, and the slanting version)

Figure 5:
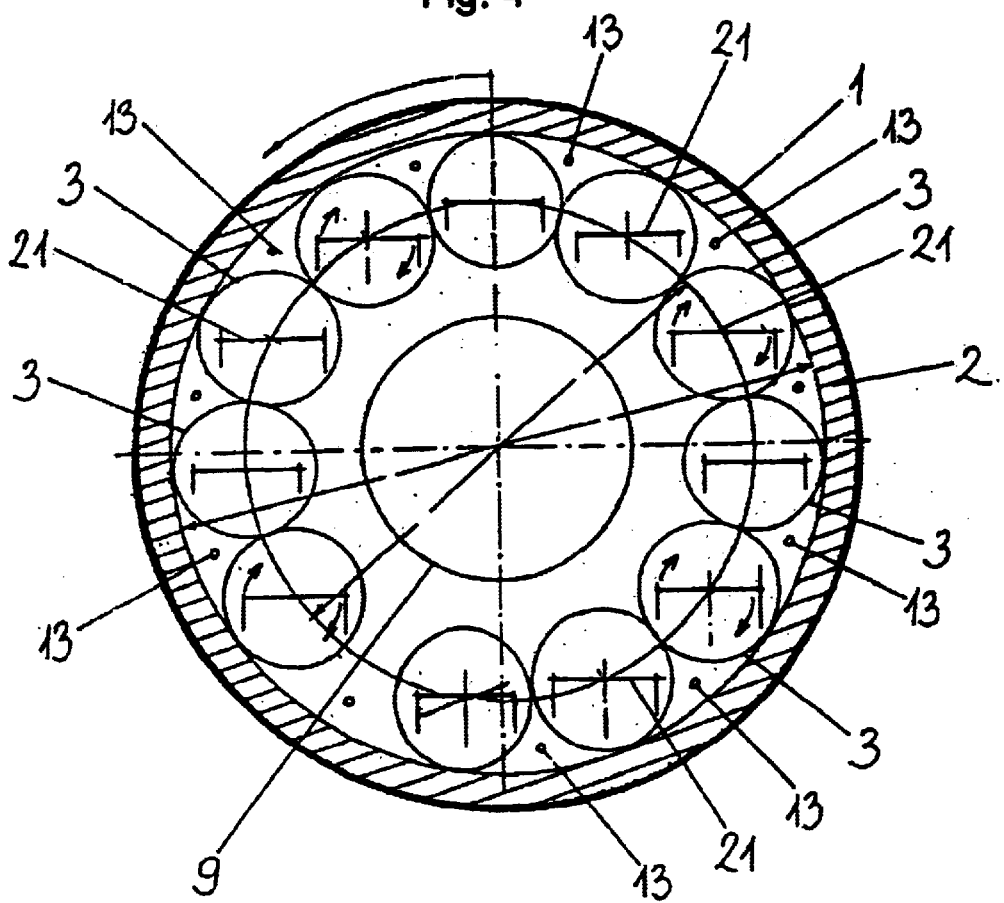

FIG. 5. shows the cross-section of the preferred embodiment of the equipment according to the invention, in case of twelve incineration chambers.(it refers to both the horizontal, and the slanting version)

Figure 6:
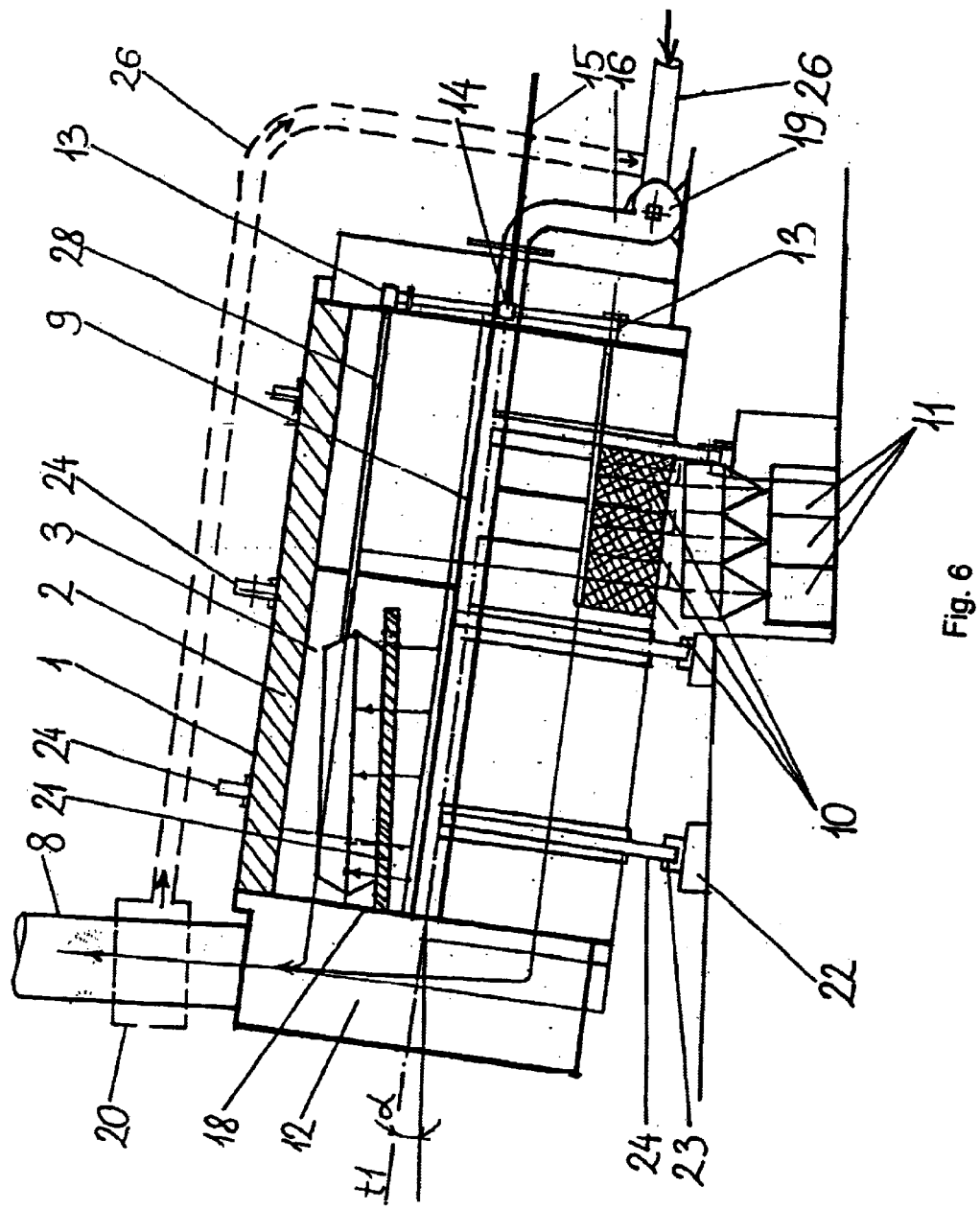

FIG. 6. shows the slanting version of the equipment according to the invention, a part of the equipment in lateral view and a part of the equipment in section can be seen.

Figure 7:
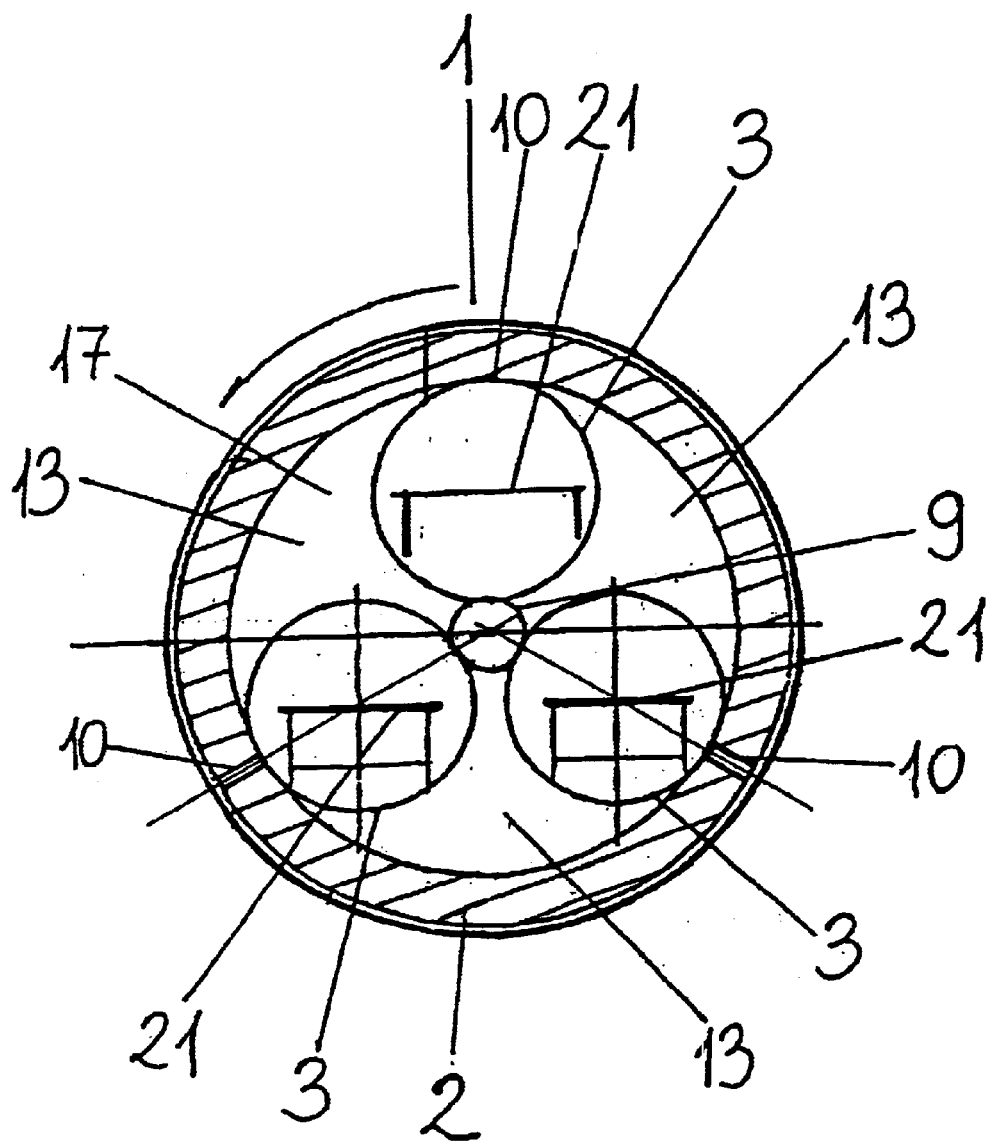

FIG. 7. shows the cross-section of the slanting version of the equipment shown on FIG. 6. in case of three incineration chambers.

Figure 8:
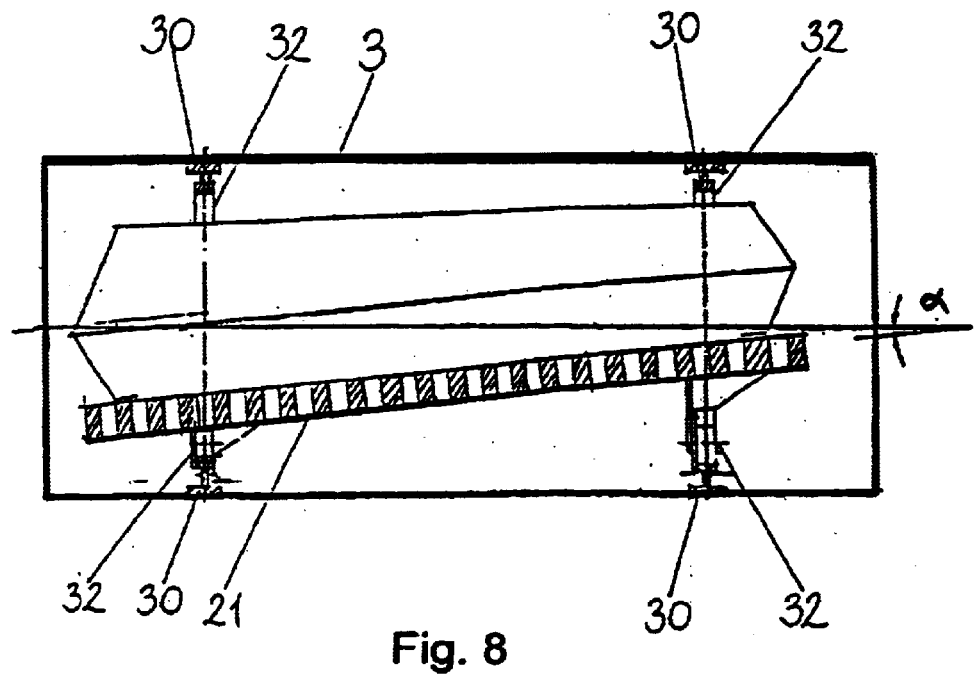

FIG. 8. shows the longitudinal section of the incineration chamber with the placement of the incineration carriage in case of the slanting version shown on FIG. 6.

Figure 9:
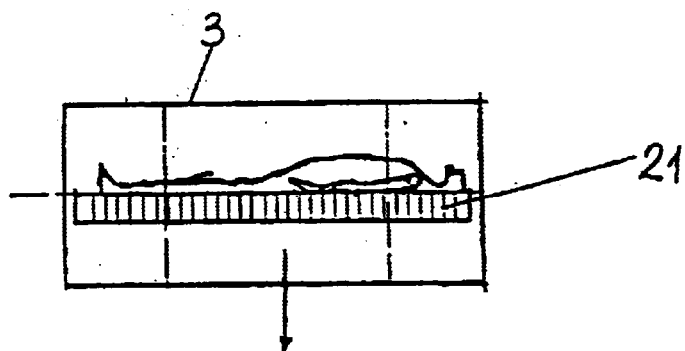

FIG. 9. shows the placement of the body on the incineration carriage and one of the solutions of the removal of the ashes.

Figure 10:
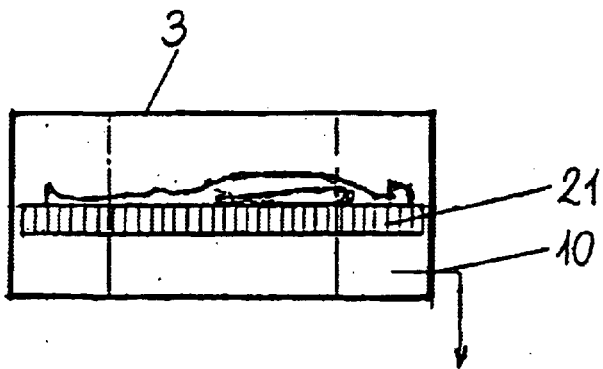

FIG. 10. shows another solution of the removal of the ashes.

Figure 11:
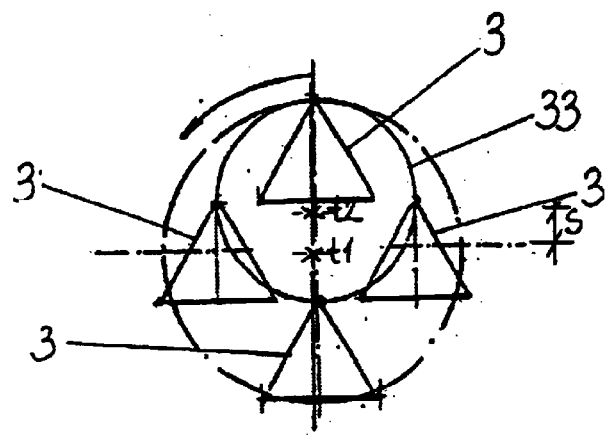

FIG. 11. shows the conceptual arrangement of the equipment with the suspended incineration gondola version according to the invention in cross-section perpendicular to the rotatory axle in case of four incineration gondolas.

Figure 12:
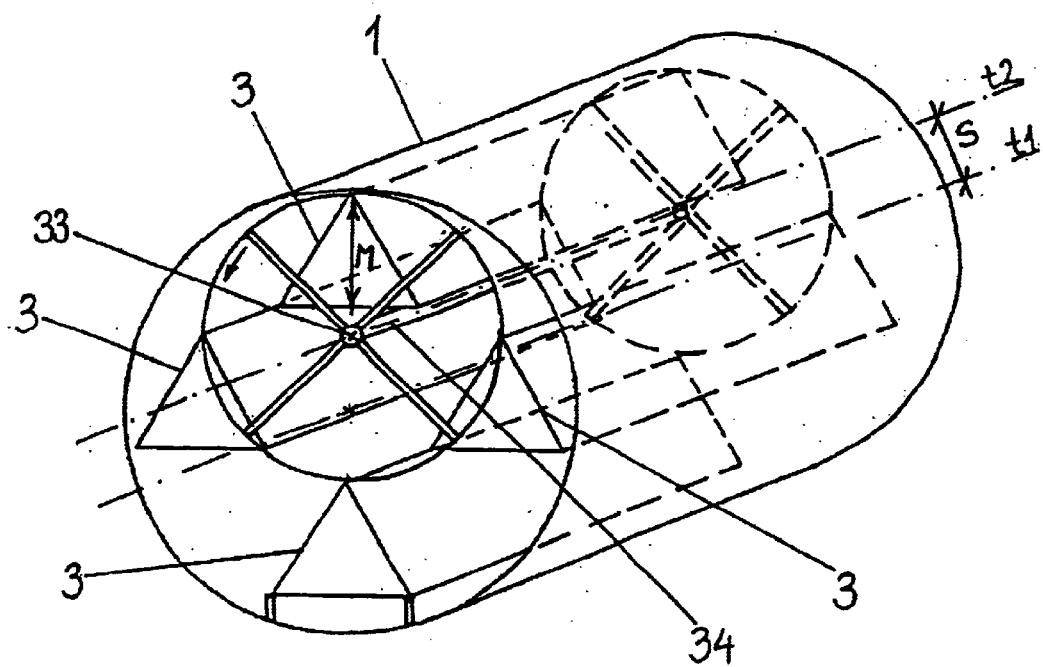

FIG. 12. shows the perspective conceptual arrangement of the suspended version of the equipment according to the invention.

Figure 13:
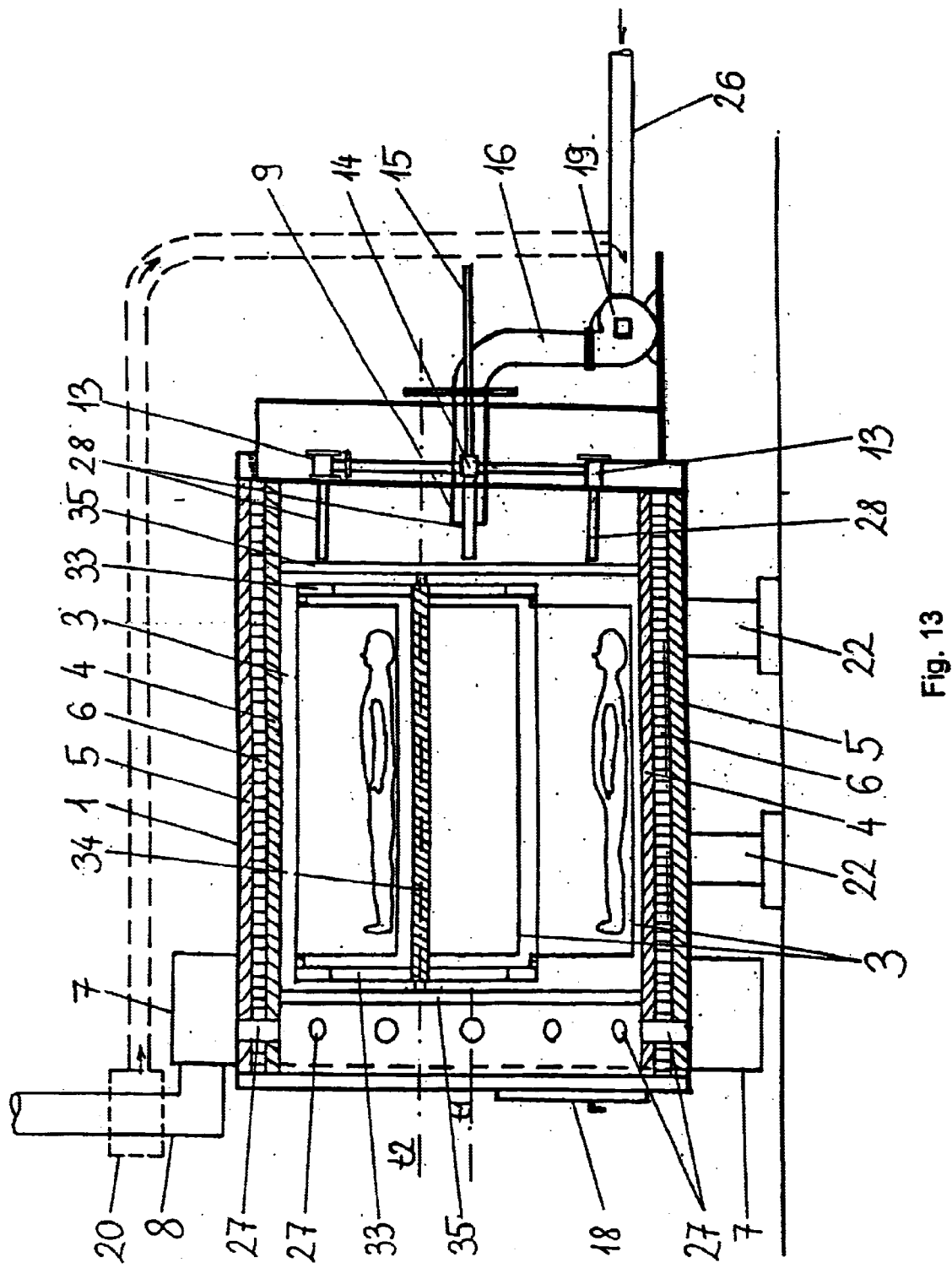

FIG. 13. shows the lateral view of the suspended version of the equipment according to the invention.

Figure 14:
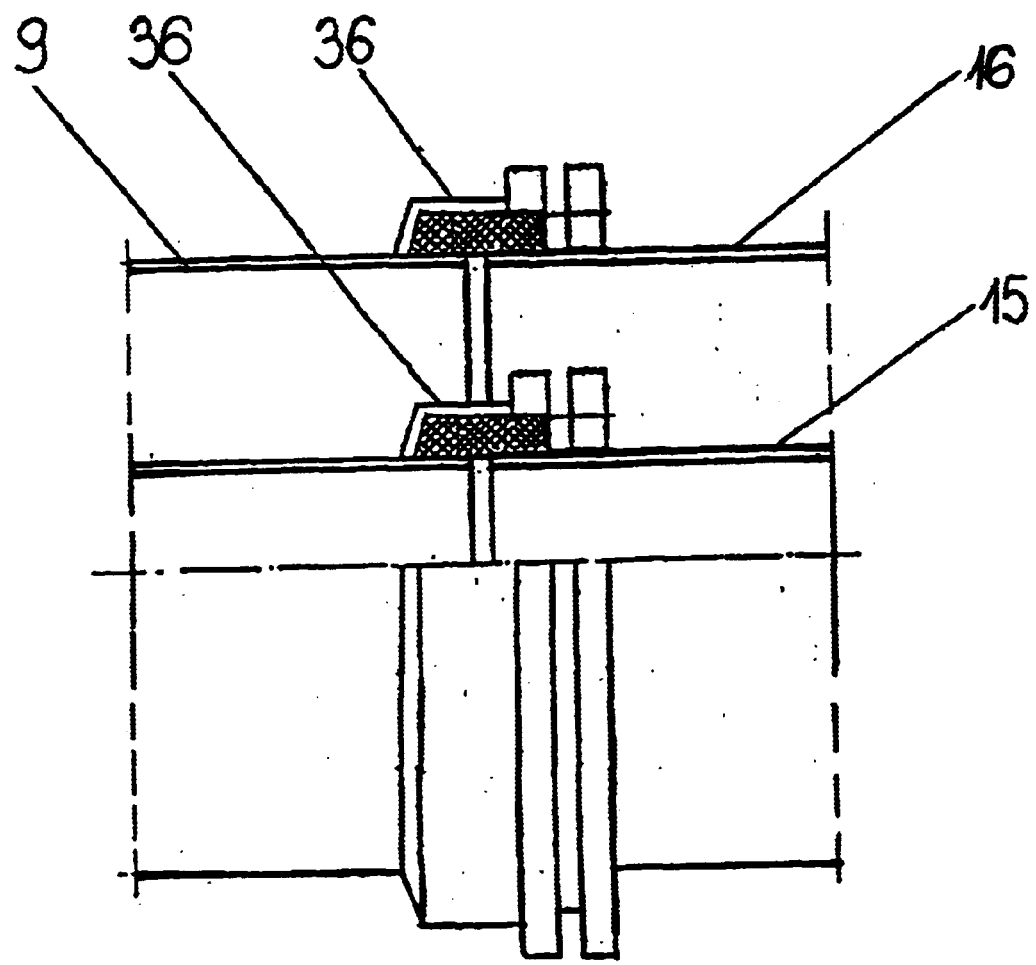

FIG. 14. shows the axle-joining between the stationary and rotating part serving as inlet for hot air and gases in half-view-half-section.

Figure 15:
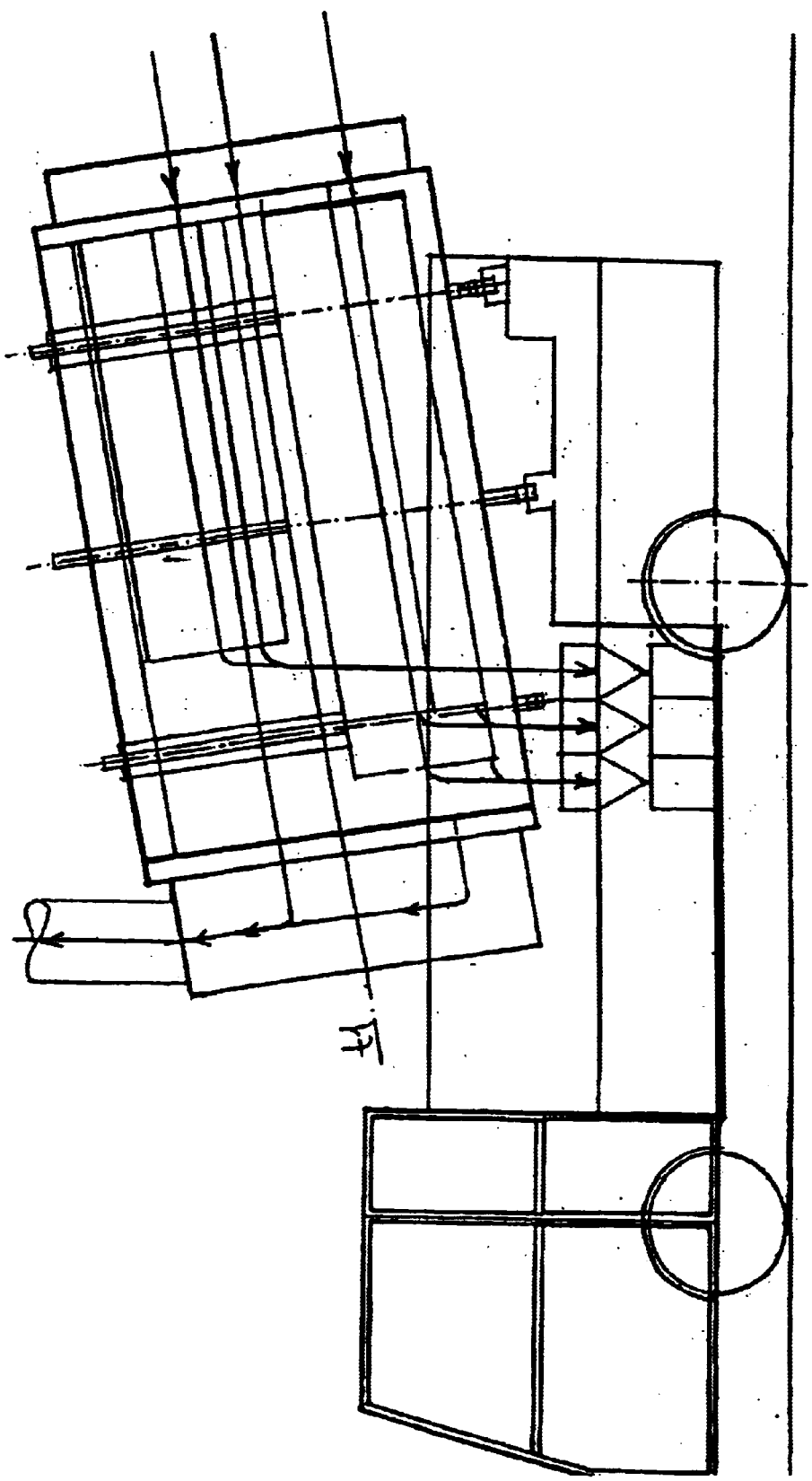

FIG. 15. shows a mobile version of the equipment according to the invention, which can be installed on a vehicle.

FIG. 1. shows the equipment in a version with horizontal axle, a part of the equipment in lateral view and a part of the equipment in section can be seen. In the figure the rotatory casing 1 placed along the outer path, provided with thermal insulating lining 2 can be seen with the incineration chambers 3 placed in said casing 1 in a horizontal, or nearly horizontal position. The body to be incinerated is placed in a coffin or on an incineration pan 31 and put on the incineration carriage 21 which is rolling on the circular roller paths 30, and said roller paths 30 are situated on the inner wall of the incineration chamber 3. The turning of the casing 1 is ensured by a rail 24 running along the outer surface of the casing 1. Said outer rail 24 is rolling on the rollers 23 supported by foots 22. The rotating of the casing 1 and at the same time the rotating of the whole incinerator is ensured by a rotating mechanism preferably placed outside the equipment, driven by an electric motor or combustion engine. The thermal insulation of the lining 2 of the casing 1 consists of three plies, the inside is of fire-clay 4,and super-thermolite 5 the outside is of thermolite 6. The material of the casing 1 is preferably steel or chrome-base alloy.

The process of starting and maintaining the incineration requires continuous air-feed. It is ensured by the ventilator 19 blowing air into the inside of the casing 1. The ventilator 19 draws the air from the incineration air inlet 25 either directly from the outer space, or partly or wholly through the air feed pipe 26 from the incineration pre-heater 20 placed on the chimney 8. This way the temperature of the air in the inside of the equipment can ensure maintaining of combustion after starting.

According to the figure the blast inlet 15 joins the equipment as well, which ensures the fuel necessary for the starting or for the temporary maintaining of combustion. The blast inlet 15 and the air pipe 16 are introduced to the inside of the rotatory casing 1 through a concentric stationary-rotatory axle-joining from the outer stationary part. The blast inlet 15 is introduced to the burners 13 to the inside of the rotatory casing 1 of the equipment through the distributing network 14, while the air pipe 16 joins the hot-air feed pipe 9 placed in the axle-line of the casing 1 and the said hot-air feed pipe 9 is preferably perforated on the side.

In case of the preferred embodiment according to the figure the guiding of the combustion residues of gas forms i.e. the smoke-gases from the rotatory casing 1 takes place with the help of the stationary smoke-holding chamber 7 placed around the casing 1. The smoke-gases leave the inside of the rotatory casing 1 during rotation through the smoke-outlets 27 to the stationary smoke-holding chamber 7 and then to the chimney 8. The proper draught of the chimney 8 and the continuous flow and deflection of the smoke-gases is ensured by a ventilator placed preferably in the chimney 8. The inner rim of the smoke-holding chamber 7 is preferably joined with the outer surface of the casing 7 in given case by a slider seal, which ensures further the gas-proof joint and proper turning of the casing 1 at the same time. Due to the draught of the chimney 8 enforced by the ventilator the combustion residues can not be guided or to a very little extent can be guided into the outer space between the smoke-holding chamber 7 and the casing 1.

The operation of the incinerator according to the preferred embodiment shown in the figure is the following: The bodies to be incinerated are placed on the incineration carriage 21 located in the incineration chamber 3 through the door 18 on the lower part of the front board 29 of the equipment. The equipment turns round with the body placed therein, during the turn another incineration chamber comes in front of the door 18, when another body can be placed through it. The incineration chambers 3 of the rotating incineration equipment can be continuously filled during the turning of the casing 1. The speed of rotation of the casing 1 is adjusted so, that during a full circle the body is completely incinerated and when the given incineration chamber 3 gets in front of the door 18 again, the incineration is fully completed in the given incineration chamber 3. It takes preferably one hour. Then the ashes are removed and another body is placed through the door 18 and the equipment turns further. The rotation of the casing 1 is so slow, that the removal of the ashes and the placing of the body can take place relatively fast during the opening of the door 18. During the opening of the door 18 the rotation of the equipment can be slowed down, or in given case it can even be stopped without disturbing the process of incineration in the other incineration chambers. This way the equipment can incinerate three, six, or twelve bodies per hour depending on the number of the incineration chambers.

FIG.2. shows the cross-section of the horizontal version of the equipment in case of three incineration chambers shown on FIG. 1, said incineration chambers are this case in identical distance in equipartition from the axle of the casing 1 inside the casing 1. The location of the incineration carriages 21 in the incineration chambers 3 is indicated in the figure. The burners 13 are situated in the smoke-gas area 17 between the incineration chambers 3 and in the axle of the casing 1 the hot-air feed pipe 9. The incineration chambers 3 of preferably perforated surface are in direct contact with the hot-air feed pipe 9 and the smoke-gas area 17, so the continuous feeding of air necessary for the incineration and the deflection of the gases during combustion is continuously solved during the rotation of the incineration chambers 3 in every case.

When starting the equipment it is necessary to ensure the proper temperature for the incineration, respectively during the process temporarily, for example at the opening of the door 18 it is necessary to increase the temperature within the casing 1 during placing of the new bodies. It is ensured beside the continuously fed pre-heated incineration air by the burners 13, which are only temporarily operated. The burners 13 heat the smoke-gas area 17 between the incineration chambers 3 and by this they heat the whole inner space of the equipment to a temperature suitable for starting the incineration process in the incineration chambers 3. After that the incineration is energetically self-sustaining and does not require outside energy. Feeding of pre-heated air prevents withdrawal of energy from the inside of the equipment. The pre-heating of the air by the heat of the smoke-gases flowing to the chimney 8 in given case preferably ensures the feeding back of the heat of the smoke-gases to the system. The combustion can be influenced and regulated by the feed-back of the pre-heated air and the mixing of the cold and pre-heated air.

During the incineration already started the placing of the bodies takes place always into one of the incineration chambers 3, this way incineration can take place undisturbed in the other chambers. Incineration taking place in several incineration chambers 3 at the same time within the closed casing 1, hot combustion gases in the smoke-gas area cause such a high inner temperature, appr. 1000–1200° C. which makes feeding of outer energy practically unnecessary or necessary to an extent that is not material. This way there is always a body, which is in the process of incineration when combustion causes high release of energy. The thermal-inertia of the equipment within the casing 1, comprising of several incineration chambers 3 is so high in the heated, continuously operating state, that it recovers, respectively covers the energy used for re-heating the newly placed body and lost during the opening of the door 18.

The location of the incineration carriages 21 is always horizontal during the rotation of the casing 1, because the incineration carriages 21 tend to the lower part of the incineration chambers 3, because the incineration carriage 21 rolls further on the wall of the incineration chamber 3 simultaneously with the rotation of the casing 1 so, that it endeavors to occupy a horizontal location again. The direction of the rotation of the casing 1 and the relevant direction of shifting of the incineration carriages 21 are indicated in the figure by arrows. The single incineration carriages 21 turn completely round on the wall of the incineration chamber 3 together with the rotation of the casing 1.

FIG. 3. shows the longitudinal section of an incineration chamber with horizontal axle with the placement of the incineration carriage 21. In the figure we can see the two rolling paths 30 where the rollers 31 located at the bottom of the incineration carriage 21 roll along. The body to be incinerated is placed on the incineration pan 31 which is situated on the incineration carriage 21, this way at the end of the incineration process the ashes remain on the incineration pan 31 and can be removed from the incineration chamber 3 together with the incineration pan 31.

FIG. 4. shows the cross-section of the preferred embodiment of the equipment, in case of six incineration chambers 3. FIG. 5 shows the cross-section of the preferred embodiment of the equipment according to the invention in case of twelve incineration chambers 3. The figures give a conceptual arrangement of the incineration chambers 3 showing, that they are arranged preferably in equipartition, along an identical radix to the center of the casing 1. As it can be seen in the figures, the diameter of the casing 1 increases only to a little extent with the increase of the number of the incineration chambers 3. This way the increase of the incineration capacity increases the size and space-demand of the equipment to a little extent only, however the incineration capacity is multiplied. The operation of the equipment and the process of the incineration is the same of the base operation in case of increased number of incineration chambers 3. The only difference is, that during the continuous operation the bodies to be incinerated should be put respectively the ashes should be removed in accordance with the turning of the casing 1. It means a considerable increase of the incineration capacity.

FIG. 6. shows the slanting version of the equipment according to the invention, a part of the equipment in lateral view and a part of the equipment in section can be seen. The figure shows the casing 1, which is provided with a thermal insulating lining 2 and is located on the outer path, where it can be rotated. The t1 axle of the casing 1 is slanted to horizontal in α=5 . . . 10°. The incineration chambers 3 are also in this slanted position and they are shifted longitudinally to each other. The incineration carriage 21 is situated horizontally in the incineration chamber 3 and said incineration carriage 21 rolls on the circular rolling paths 30, which are located on the inner wall of the incineration chamber 3. The body to be incinerated is put into a coffin or on the incineration pan 31, which is put into the incineration carriage 21. The horizontal position of the incineration carriage 21 is ensured by the different height of supports, determined by the slanting of the incineration chamber 3. Due to the fact, that the mantle of the cylinder-shaped incineration chamber 3 is parallel with the axle of the casing 1, the support of different heights ensures the horizontal position of the incineration carriage 21 during rotation.

The rotation of the casing 1 is ensured by the rail 24 running around the outer surface of the casing 1, as shown in FIG. 1. The outer rail 24 rolls on the rollers 23 supported by the foots 22. The different height of the foots 22 determines the slanting position. The rotation of the casing 1 and the whole incineration equipment is ensured by a rotatory mechanism driven by an electric motor or a combustion engine placed preferably outside the equipment. The inner thermal insulating lining 2 of the casing 1 is preferably three-ply, an inner heat-proof fire-clay 4, superthermolite 5, and an outer ply of thermolite 6. The material of the casing 1 is preferably steel or chrome-base alloy.

The incineration process is similar to the preferred embodiment shown in FIG. 1. The ventilator 19 ensures air-feed for the staring and continuous maintaining of the process in the inside of the casing 1. The ventilator 19 draws the air from the incineration air inlet 25 either directly from the outer space, or partly or wholly through the air feed pipe 26 from the incineration pre-heater 20 placed on the chimney 8 of the equipment. This way it is ensured, that the air fed into the inside of the equipment is pre-heated to such temperature, which will ensure the continuity of combustion.

The blast inlet 15 shown in the figure belongs to the equipment as well, ensuring fuel feed for the starting of combustion or for the temporary maintaining of it. The blast inlet 15 and the air pipe 16 are introduced to the inside of the rotating casing 1 of the equipment from the outer stationary part through a concentric stationary-rotating axle-joining. Within the casing 1 the blast inlet 15 is guided to the burners 13 through the distributing network 14, whereas the air pipe 16 joins the hot-air feed pipe 9 located in the axle-line of the casing 1. The hot-air feed pipe 9 is preferably perforated on the sides.

The basic difference of the preferred embodiment of the equipment according to the invention between the slanting embodiment shown in FIG. 6. and the embodiment shown in FIG. 1 is, that in case of the slanting form, the ashes can be easily automatically removed. The grinding and holding units 11 belonging to each incineration chambers 3 are placed below the equipment. The ashes produced during the incineration will be removed in a preferred embodiment from the inside of the casing 1 to the grinding and holding unit 11 placed below the equipment through the outlet for ashes 10 joining the lower end of the incineration chamber 3.

Selective collection of ashes can be realized as well in case of incineration chambers 3 shifted longitudinally to each other, because ashes can be disposed from each incineration chamber 3 into the grinding and holding unit 11 placed right below the incineration chamber 3. In case of automatic removal of the ashes an incineration carriage 21 with perforated board is applied, the body should be placed on the carriage 21 without closed lower foot-board. Perforation ensures, that the ashes fall below the incineration carriage 21 and are collected in the actual bottom. During rotation, when the opening 10 on the lower edge of the incineration chamber 3 comes to the lowest position, the accumulated ashes come through this to the grinding and holding unit 11. This way after the incineration of one body, the ashes can be selectively removed from the grinding and holding unit 11.

In the preferred embodiment of the equipment according to the figure the deflection of the gas-type combustion products, the smoke-gases from the rotating casing 1 takes place with the help of the smoke-gas outlet 12 placed before the casing 1. The smoke-gases flow from the inside of the rotating casing 1 during rotation to the stationary smoke-gas outlet 12 then to the chimney 8. The ventilator placed preferably in the chimney 8 ensures the draught of the chimney 8 and the continuous flow and deflection of the smoke-gases. The rim of the smoke-gas outlet 12 joins in given case the rim of the casing 1 by a slide seal, which ensures the gas-closing joint and at the same time the turning of the casing 1. Due to the draught of the chimney 8 enforced by the ventilator the combustion residues can not be deflected or can be guided to a very little extent into the outer space between the smoke-holding chamber 7 and the casing 1. The smoke-gas outlet 12 is divided from the inside of the casing 1 by a perforated door 18, through which the gas combustion products leave the incineration chamber 3. In this preferred embodiment each incineration chamber 3 is provided with a separate perforated door 18, which ensures deflection of gas-type combustion products to the smoke-gas outlet 12 placed in front of the door 18.

The operation of the incineration equipment shown in FIG. 6 is as follows: The bodies to be incinerated are put on the incineration carriage 21 situated in the incineration chamber 3 through the door 18. For this manipulation the smoke-gas outlet 12 unit should temporarily be removed, and after placing the body, it should be placed back in front of the casing 1. The equipment turns round with the body placed therein, then another body can be placed in another incinerator chamber. The incineration chambers 3 of the rotating incineration equipment can be continuously filled during the rotation of the casing 1. The rotating speed of the casing 1 ensures complete incineration of one body during one turn, this way when the given incineration chamber 3 gets into the initial position again, the incineration is fully completed in the given incineration chamber 3. It preferably takes place within one hour. Then the removal of the ashes and placing of another body through the door 18 takes place, and the equipment rotates further. The rotation of the casing 1 is so slow, that removal of the ashes and placing of the new body can be relatively quickly executed during the opening of the door 18. During the opening of the door 18 the rotation of the equipment can be slowed down, or in given case it can even be stopped, as it will not disturb the process of incineration in the other incineration chambers. So it is possible to incinerate three, six or twelve bodies per hour at the same time depending on the number of the incineration chambers.

FIG. 7. shows the cross-section of the slanting version of the equipment shown on FIG. 6. in case of three incineration chambers, which are this case in identical distance from the axle of the casing 1 in equipartition within the casing 1. The location of the incineration carriages 21 was indicated in the incineration chambers 3. The burners 3 are located in the smoke-gas area 17 situated between the incineration chambers 3. The hot-air feed pipe 9 can be found in the axle of the casing 1. The incineration chambers 3 are of preferably perforated surface or closed. The incineration chambers 3 are in direct contact either through the perforation or only through their ends with the hot-air feed pipe 9 and the smoke-gas area 17, this way the continuous feed of the air required for the combustion and the deflection of the gases produced during combustion is continuously ensured in every position of the incineration chambers 3 during rotation.

It is necessary to ensure the proper temperature for the starting of the equipment, respectively it is necessary to increase temperature temporarily during the process within the casing 1, for example during the opening of the door 18, during the placing of the new bodies. It is ensured by the burners 13 operated temporarily, beside the continuous pre-heated incineration air feed. The burners 13 will heat the smoke-gas area 17 between the incineration chambers 3, this way the whole inner space of the equipment will be heated to a temperature suitable for starting the incineration process in the incineration chambers 3. After that the incineration is energetically self-sustaining and does not require outside energy. Feeding of pre-heated air prevents withdrawal of energy from the inside of the equipment because of the heating of the air. The pre-heating of the air by the heat of the smoke-gases flowing to the chimney 8 in given case preferably ensures the feeding back of the heat of the smoke-gases to the system. The combustion can be influenced and regulated by the feed-back of the pre-heated air and the mixing of the cold and pre-heated air.

During the incineration already started the placing of the bodies takes place always into one of the incineration chambers 3, this way incineration can go on independently in the other chambers. Incineration taking place in several incineration chambers 3 at the same time within the closed casing 1, hot combustion gases in the smoke-gas area produce such a high inner temperature, appr. 1000–1200° C. which makes feeding of outer energy practically unnecessary or necessary to a minimal extent. This way there is always a body, which is in the process of incineration when combustion causes high release of energy. The thermal-inertia of the equipment within the casing 1, comprising of several incineration chambers is so high in the heated, continuously operating state, that it recovers, respectively covers the energy lost during the opening of the door 18 and used for re-heating the newly placed body.

The position of the incineration carriages 21 is always horizontal during the rotation of the casing 1, because the incineration carriages 21 tend to the lower part of the incineration chambers 3, because the incineration carriage 21 rolls further on the wall of the incineration chamber 3 simultaneously with the rotation of the casing 1 so, that it endeavors to occupy a horizontal location again. The direction of the rotation of the casing 1 and the relevant direction of shitting of the incineration carriages 21 are indicated in the figure by arrows. The single incineration carriages 21 turn completely round on the wall of the incineration chamber 3 together with the rotation of the casing 1.

FIG. 8. shows the longitudinal section of an incineration chamber with the placement of the incineration carriage 21 in the slanting version shown in FIG. 6. In the figure we can see the two rolling paths 30 where the rollers 31 located at the bottom of the incineration carriage 21 roll along. The horizontal position of the incineration carriage 21 is ensured by the different height of supports, determined by the slanting of the incineration chamber 3 respectively together with it the slanting of the whole casing 1. Due to the fact, that the mantle of the cylinder-shaped incineration chamber 3 is parallel with the axle of the casing 1, the supports of different heights ensure the horizontal position of the incineration carriage 21 during the rotation. The body to be incinerated is placed with or without the coffin on the incineration carriage 21, this way during the incineration process the ashes fall to the lower part of the incineration chamber 3 through the perforations of the incineration carriage 21 and can be removed from the incineration chamber 3 through the opening 10.

FIG. 9. shows the placement of the body on the incineration carriage 21 and one of the solutions of the removal of the ashes. This case the selective collection of the ashes does not take place. The ashes fall from the also perforated incineration chamber 3 through the perforations of the incineration carriage 21 to a common space.

Another solution for the removal of the ashes is depicted in FIG. 10. This case the possibility of the selective collection of ashes is given. This case the ashes fall to the closed surface bottom of the incineration chamber 3 through the perforations of the incineration carriages 21, and from the bottom of the chamber the ashes fall through the opening 10 located at the end of the incineration chamber 3 to the selective grinding and holding unit 11.

FIG. 11. shows the conceptual arrangement of the equipment with the suspended incineration gondola 37 version according to the invention in cross-section perpendicular to the rotatory axle in case of four incineration gondolas 37. This case the incineration gondolas 37 move along a circular path suspended with a joint on a rotating frame 33. The direction of the rotation is indicated in the figure by an arrow. During the rotation of the frame 33 the bottom of the incineration gondolas 37 remain always horizontal due to their suspension and keep their position while rotating.

FIG. 12. shows the conceptual arrangement of the equipment according to the invention in perspective. It can be seen well in the figure, that the incineration gondolas 37 are suspended and rotated on the frames 33 placed at their both ends within the casing 1. This case the casing 1 can be fixed, it does not need to be rotated. It is sufficient if the frames 33 are rotated in synchronism with each other. The upper part of the incineration gondolas 37 suspended on the upper side is preferably open or closed, but a surface definitely provided with perforation. The incineration gondolas 37 are in given case of triangle base prismatic shape. The perforation ensures connection between the inside of the incineration gondolas 37 and the smoke-gas area 17 inside the casing 1. The bottom of the incineration gondola 37 is closed, respectively the body to be incinerated is preferably placed into said incineration gondola 37 in a preferably closed incineration pan 31.

The axle t1 of the casing 1 and the axle t2 of the frames 33 is at a distance S from each other, the size of which is determined by the suspension height M and lateral extension of the incineration gondola 37. The distance of the t1, t2 axles should be chosen so, that the incineration gondola 37 can be placed in its lower suspended position within the casing 1 as well.

The lateral section of the suspended version of the preferred embodiment of the equipment according to the invention can be seen in FIG. 13. The casing 1 fixed this case on the foots 22 provided with a thermal insulating lining 2 can be seen in this figure. The rotatable incineration gondolas 37 of prismatic shape, are on the frames 33 joined with each other by axle 34. The incineration gondolas 37 are in horizontal or nearly horizontal position. The body to be incinerated is placed in the coffin or on the incineration pan 31. The fixing and positioning of the frame 33 is ensured by the holders 35 joined to the inner surface of the fixed casing 1. In given case the axle 34 of the frames 33 is joined with bearings to the holders 35. The rotation of the frame 33 is ensured by a rotatory mechanism driven by an electric motor or a combustion engine placed preferably inside or outside the casing 1. The inner thermal insulating lining 2 of the casing 1 is preferably three-ply, an inner heat-proof fire-clay 4, and superthermolite 5 ply, and an outer ply thermolite 6. The material of the casing 1 is preferably steel or chrome-base alloy.

The starting and continuous maintenance of the incineration process requires continuous air feed. The ventilator 19 ensures air-feed to the inside of the casing 1. The ventilator 19 draws the air from the incineration air inlet 25 either directly from the outer space, or partly or wholly through the air feed pipe 26 from the incineration pre-heater 20 placed on the chimney 8 of the equipment. This way it is ensured, that the air fed into the inside of the equipment is pre-heated to such temperature, which will ensure the continuity of the combustion after the starting. The blast inlet 15 is also joined the equipment, ensuring fuel feed for the starting and temporary maintenance of the combustion.

In case of the equipment shown in FIG. 13 intake of air can be solved in two ways. In case the burners 13 are not rotated in relation to the frame 33, then the blast inlet 15 and the air pipe 16 is simply introduced to the inside of the casing 1. This way independently of the position of the incineration gondolas 37 the blast inlet 15 and the air pipe 16 are fixed in relation to the casing 1.

In the other solution the burners 13 are also rotated together with the frame 33. This case the blast inlet 15 and the air pipe 16 is lead to or between the incineration gondolas 37 of the equipment through the concentric stationary-rotating axle-joint mentioned earlier. Within the casing 1 the blast inlet 15 joins the burners 13 through the distributing network 14, whereas the air pipe 16 joins the hot-air feed pipe 9 located in the axle-line of the casing 1, preferably perforated on the sides. The burners 13 should be rotated by an identical angle-speed together with the frame 33, but with a shifted axle to the frame 33, in the axle of the casing 1. This case due to the rotating frame 33 the hot-air feed pipe 9 and the flame inlet 28 of the burners 13 can not be lead directly to the incineration gondolas 37, but it can be achieved, that both the flame and the direction of the hot air will be optimal for the starting and maintaining of the combustion.

In case of the preferred embodiment according to FIG. 13. the guiding of the combustion residues of gas forms i.e. the smoke-gases from the stationary casing 1 takes place with the help of the also stationary smoke-holding chamber 7 placed around the casing 1. The smoke-gases leave the inside of the casing 1 through the smoke-outlets 27 to the stationary smoke-holding chamber 7 and then to the chimney 8. The proper draught of the chimney 8 and the continuous flow and deflection of the smoke-gases is ensured by a ventilator 19 placed preferably in the chimney 8. Due to the draught of the chimney 8 enforced by the ventilator the combustion residues can not be guided or only to a very little extent can be guided into the outer space between the smoke-holding chamber 7 and the casing 1.

The operation of the incineration equipment according to the preferred embodiment shown in FIG. 13 is the following:

The bodies to be incinerated are put in the incineration gondola 37 which happens to be there through the door 18 placed on the lower part of the front board 29 of the equipment. The equipment turns round with the body placed therein, during which another incineration gondola 37 arrives in front of the door 18 through which another body can be placed in the incinerator gondola 37. The incineration gondolas 37 of the rotating incineration equipment can be continuously filled during the rotation of the frame 33. The rotating speed of the frame 33 ensures complete incineration of one body during one turn, this way when the given incineration gondola 37 arrives in front of the door 18 again, the incineration is fully completed. It preferably takes place within one hour. Then the removal of the ashes and placing of another body through the door 18 takes place, and the equipment rotates-further. The rotation of the casing 1 is so slow, that removal of the ashes and placing of the new body can be relatively quickly executed during the opening of the door 18. During the opening of the door 18 the rotation of the equipment can be slowed down, or in given case it can even be stopped, as it will not disturb the process of incineration in the other incineration gondolas 37. So it is possible to incinerate three, six or twelve bodies per hour at the same time depending on the number of the incineration gondolas 37.

The axle-joining between the stationary and rotating part serving as inlet for hot air and gases can be seen in FIG. 14. in half-view-half-section. The stationary and rotatory part of the blast inlet 15 is inside the joining and the stationary and rotatory part of the air pipe 16 is outside the joining. The air pipe 16 joins the hot-air feed pipe 9. The stationary and rotatory axle-studs are joined with pressure-proof rotating seals 36 preferably with slider oil-seals.

FIG. 15 shows the equipment according to the invention in a mobile version, which can be installed on a vehicle. Any version of the equipment can be mobilized, installed on a vehicle, for example on a truck, and can be transported to the place of required application. It makes possible the use of the incineration equipment of great capacity according to the invention independent on location, for example in case of danger of epidemic or natural catastrophes.

In case of a preferred embodiment of the solution according to the invention the possible diameter, respectively the width of the incinerator chamber 3 or incinerator gondola 37 is 80 centimeters. The outer diameter of the casing comprising three incineration chambers 3 or incinerator gondolas 37 is 2 . . . 2,2 metres. The outer diameter of the casing comprising six incineration chambers 3 or incinerator gondolas 37 is 2,8 . . . 3,2 metres. The outer diameter of the casing comprising twelve incineration chambers 3 or incinerator gondolas 37 is 3,8 . . . 4 metres, only 30% more, than the size of the version with six chambers or gondolas, whereas its capacity is the double. The joints of the rotatory and stationary parts of the equipment is gas-proof sealed for example with slider or oil-seals.

The advantage of the solution according to the invention is, that it makes possible execution of the process of incineration with a continuous, economical and environment-friendly way. The equipment can be used as stationary or when necessary it can be made transportable.

The solutions according to the invention can be advantageously used for disposing of animal bodies by incineration as well, particularly in case of danger of spreading of contagious diseases, e.g. mad-cow disease, or mouth and foot disease, when undelayed incineration of bodies is crucial to prevent spreading of the disease.

List of references:

1 casing
2 thermal insulating lining
3 incineration chamber
4 fireclay
5 superthermolite
6 thermolite
7 smokeholding chamber
8 chimney
9 hotair feed pipe
10 outlet for ashes
11 grinding and holding unit
12 smokegas outlet
13 burner
14 distributing network
15 blast inlet
16 airpipe
17 smokegas area
18 door
19 ventilator
20 incineration preheater
21 incinerator carriage
22 foot
23 roller
24 outer rail
25 incineration air inlet
26 airfeedpipe
27 smoke outlets
28 flame inlet
29 front board 29
30 roller path
31 incineration pan
32 roller
33 frame
34 axle
35 holder
36 seal
37 incineration gondola
t1 rotatory axle (casing)
t2 rotatory axle (frame)
S distance (t1 and t2)

What is claimed is:

1. Incinerator of rotative system consisting of several separated incinerator units heated with hot gases and/or hot air set in a common rigid outer casing built in such a way, that space between incinerator units provides for holding and discharging of smoke-gas, where an intermediate space has separate connection with each incinerator unit, further there is an incineration area in the incinerator unit for direct or indirect placing of a body to be incinerated, comprising:

incinerator chambers (3) of cylinder inner shape set at equal distance from rotary axle (t1) in an outer casing (1) provided with thermal insulation (2) rotated around an axle (t1) are realised as incinerator units, the longitudinal axle of the incinerator chambers (3) is parallel with the rotatory axle of the outer casing (1), and inside the incinerator chambers (3) on the inner surface of the incinerator chambers (3) incinerator carriages (21) are located, and said incinerator carriages (21) are rolling on a roller path (30) provided on the inner surface of the incinerator chambers (21) for placing of the body to be incinerated, and a door (18) for placing of bodies is put on one of the front walls perpendicular to the rotatory (t1) of the casing (1), on the opposite wall the incinerator is provided with a blast inlet (15) and a hot air feed pipe (9), further one or more burners (13) are placed within the inside of the casing (1).

2. Incinerator according to claim 1, wherein in the incinerator there are at least two, three, six, or twelve cylinder-shaped incinerator chambers (3) at equal distance from the rotatory aide (t1) of the casing (1), said casing being cylinder-shaped and said incinerator chambers (3) being placed in equipartition along the periphery of the casing (1).

3. Incinerator according to claim 1, comprising a fitting piece placed in the rotatory axle (t1) of the outer casing (1) for a blast inlet and a gas-pipe, and further comprising a stationary smoke-holding chamber (7) which completely encloses from outside the rotating outer casing (1) and the smoke-holding chamber joins a smoke-gas area situated in the inside of the outer casing (1) to discharge smoke-gas through smoke outlets (27) and further the smoke-holding chamber (7) being channeled directly or indirectly to a chimney (8).

4. Incinerator according to claim 1, comprising outer rails (24) on an outer casing (1) to support and rotate the rotator of die incinerator and said outer rails (24) are supported from the outside by rollers (23) and on the outer casing (1) further comprising a cogged-curved path joining a cogwheel rotatory mechanism.

5. Incinerator according to claim 1, wherein the rotatory axle (t1) of the casing (1) of the incinerator and the axles of the cylinder-shaped incinerator chambers (3) located in the casing (1) are horizontal or nearly horizontal and the incinerator carriages (21) being in the incinerator chambers (3), and said incinerator carriages (21) being situated parallel with the rotatory axle (t1) of the casing (1).

6. Incinerator according to claim 1, wherein the rotatory axle (t1) of the casing (1) of the incinerator and the rotatory axle of the cylinder-shaped incineration chambers (3) are at angles $\alpha = 5° \ldots 10°$ to a horizontal surface, and the incineration carriages (21) are situated horizontally or nearly horizontally in the incineration chambers (3) and said incineration carriages (21) are at angle $\alpha$ to the rotatory axle (t1) of the casing (1).

7. Incinerator according to claim 6, wherein walls of the incinerator chambers (3) are closed from the bottom and from the sides and in the walls of the incinerator chambers (3) there are outlets for ashes (10) to discharge automatically the ashes, and said outlets for ashes (10) join grinding and holding units (11), and said grinding and holding units (11) are placed outside the rotating casing (1).

8. Incinerator according to claim 1, wherein walls of the incinerator chambers (3) are perforated ensuring contact of the smoke-gas area (11) inside the casing and the incinerator chambers (3).

9. Incinerator of rotative set in a common rigid outer casing, heated with hot gases and/or hot air, consisting of several separated incinerator units, comprising a space between incinerator units for holding and discharging of smoke-gas, with intermediate space having a separate connection with each incinerator unit, further there is an incineration area in the incinerator unit for direct or indirect placing of a body to be incinerated, comprising:

within a stationary outer casing (1) provided with thermal insulation (2) incineration gondolas (37) are suspended on rowing frames (33) in such a way, that a rotatory axle (t2) of the rotating frames (33) is parallel with a rotatory axle (t1) of the outer easing (1), but said axle (t2) is vertically shifted by a distance (S) upside, further the incinerator is provided with a door (18) ensuring placing of bodies on one from walls perpendicular to the rotatory axle (t1) of the casing (1), on an opposite wall of the incinerator a blast inlet (15) and a hot air feed pipe (9) is provided, further one or more burner (13) is placed within the inside of the casing (1).

10. Incinerator according to claim 9, comprising suspensions of the incineration gondolas (37) which are located at equal distance from the rotatory axle (t2 of the frame (33) placed in equipartition along the periphery of said frame and the longitudinal axle of the incineration gondolas (37) being parallel with the rotatory axle of the frame (33).

11. Incinerator according to claim 9, wherein on the rotating frame (33) there are three, four six, or twelve incineration gondolas (37) suspended.

12. Incinerator according to claim 9, wherein the incineration gondolas (37) are of prismatic shape, the gondolas are closed from the bottom and from the sides, or their surface is partly or wholly provided with perforations.

13. Incinerator according to claim 1, wherein the incinerator can be executed either in a stabile, stationary finish, or a mobile one, which can be placed on a car or any other vehicle.

* * * * *

UNITED STATES PATENT AND TRADEMARK OFFICE
CERTIFICATE OF CORRECTION

PATENT NO. : 6,772,701 B2 Page 1 of 1
APPLICATION NO. : 10/363927
DATED : August 10, 2004
INVENTOR(S) : Gabor Földes It is certified that error appears in the above-identified patent and that said Letters Patent is hereby corrected as shown below:

Column 14, Line 21, Claim 2:

Delete "aide" and insert -- axle --.

Column 14, Line 36, Claim 4:

Delete "die" and insert -- the --.

Column 15, Line 9, Claim 9:

Delete "rowing" and insert -- rotating --.

Column 15, Line 14, Claim 9:

Delete "from" and insert -- front --.

Column 16, Line 3, Claim 10:

Delete "(t2" and insert -- (t2) --.

Signed and Sealed this

Twenty-second Day of January, 2008

JON W. DUDAS
*Director of the United States Patent and Trademark Office*